(12) United States Patent
Ambani

(10) Patent No.: US 7,117,173 B1
(45) Date of Patent: Oct. 3, 2006

(54) SYSTEM AND METHOD FOR PROVIDING FINANCIAL SERVICES TO CHILDREN AND TEENAGERS

(76) Inventor: Sonal Sheth Ambani, 26 Appledale La., Chestnut Ridge, NY (US) 10977

( * ) Notice: Subject to any disclaimer, the term of this patent is extended or adjusted under 35 U.S.C. 154(b) by 1272 days.

(21) Appl. No.: 09/773,555

(22) Filed: Feb. 2, 2001

(51) Int. Cl.
*G06Q 40/00* (2006.01)

(52) U.S. Cl. ..................................... 705/35

(58) Field of Classification Search .............. 705/40, 705/35
See application file for complete search history.

(56) References Cited

U.S. PATENT DOCUMENTS

| | | | |
|---|---|---|---|
| 5,864,830 A * | 1/1999 | Armetta et al. | 705/41 |
| 5,953,710 A | 9/1999 | Fleming | |
| 5,963,925 A * | 10/1999 | Kolling et al. | 705/40 |
| 6,029,141 A | 2/2000 | Bezos et al. | |
| 6,032,957 A | 3/2000 | Kiyosaki et al. | |
| 6,106,300 A * | 8/2000 | Kiyosaki et al. | 434/107 |
| 6,224,381 B1 * | 5/2001 | Culberson et al. | 434/110 |
| 6,609,106 B1 * | 8/2003 | Robertson | 705/26 |
| 2001/0039657 A1 * | 11/2001 | Fopeano et al. | 725/9 |

FOREIGN PATENT DOCUMENTS

JP 2004227467 A * 12/2004

OTHER PUBLICATIONS

One Share of Stock Inc—My First Stock webpage, last modified May 2, 2000, 2 pages.*
One Share of Stock Inc—Dividend Reinvestment Plan webpage, last modified Apr. 12, 1999, 1 page.*
Banking Products for Children . . . Getting Them to be Fiscal, Business Line, Oct. 19, 2003, 3 pages.*

* cited by examiner

*Primary Examiner*—Charles R. Kyle
(74) *Attorney, Agent, or Firm*—Bacon & Thomas, PLLC

(57) ABSTRACT

A system and method of providing financial services to children provides a child-friendly user-interface that includes an age-appropriate integrated financial services account statement having links to multimedia files providing information on or related to specific assets listed in the statement. The system and method of the invention may also be used as a convenient way of giving gifts to a child, and as a portal to a variety of child-related services and products.

19 Claims, 12 Drawing Sheets

| Logo | Picture | Company/Fund | Current Price | Purchase Price | Result |
|---|---|---|---|---|---|
| *Auto Manufacturers* | | | | | |
| | | Ford Motor Company | $53.31 | $51.26 | ☺ |
| | | General Motors | $72.69 | $72.50 | ☺ |
| | | DaimlerChrysler | $78.00 | $83.24 | ☹ |
| *Toy Manufacturers* | | | | | |
| | | Mattel | $13.13 | $12.99 | ☺ |
| | | Toys R Us | $14.31 | $11.00 | ☺ |
| *Country Funds* | | | | | |
| | | India Fund | $16.75 | $12.32 | ☺ |
| | | Japan Fund | $9.69 | $9.50 | ☺ |
| | | Israel Fund | $13.00 | $19.00 | ☹ |
| *Telephone Companies* | | | | | |
| | | AT&T | $50.81 | $41.09 | ☺ |
| | | MCI WorldCom | $53.06 | $52.87 | ☺ |

FIG. 4B

| Logo | Fund | Current Price | Purchase Price | Result |
|---|---|---|---|---|
|  | College Fund | 140 | 66 | ● |
|  | Golf Membership Fund | 190 | 162 | ● |
|  | Fun in the Sun Fund | 30 | 22 | ● |
|  | Valentine's Day Fund | 31 | 13 | ● |
|  | Millionaire Fund | 25 | 20 | ● |
|  | Hanukah Fund | 170 | 142 | ● |
|  | Christmas Fund | 25 | 12 | ● |
|  | Go Wild when I'm 65 Fund | 65 | 30 | ● |
|  | 75 and I Still Jive Fund | 75 | 50 | ● |
|  | My Daughter's Wedding Fund | 419 | 220 | ● |
|  | My Grandchild's Fund | 324 | 208 | ● |
|  | NaNaNaNa Fund | 222 | 111 | ● |
|  | AAAAAhhhhh Fund | 777 | 444 | ● |
FIG. 4C

Teen-Friendly Bank Statement
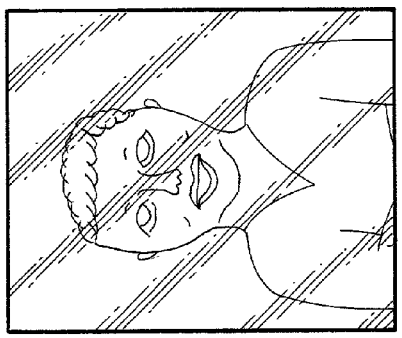
- Name: John Smith
- Age: 18
- Favorite Band: Nirvana
- Future Occupation: Doctor
- Favorite Sport: Soccer
- Favorite Charity: Make a Wish
- School: Roosevelt High
- Address: 123 Anywhere Ln. Smithtown, NY 11111
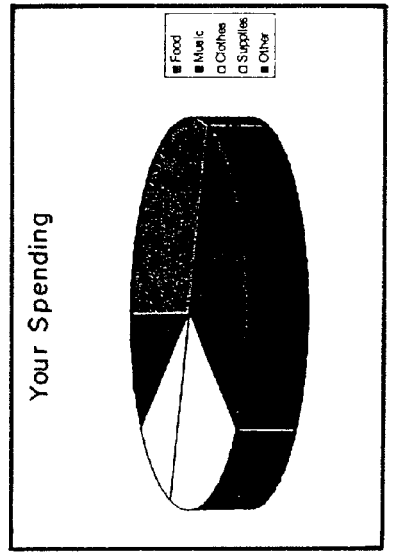
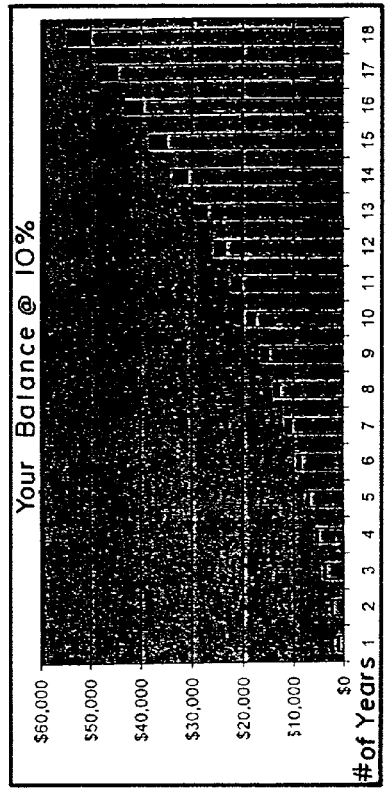
FIG. 8A

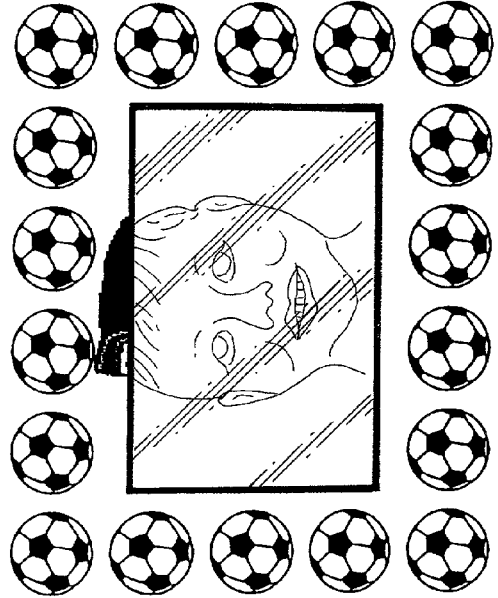

My Page
- Name: John Smith
- Age: 7
- Favorite Color: ■ Blue
- Favorite Song: Pokemon
- Favorite Sport: Soccer
- When I Grow Up I Want to Be a: Fireman
- Favorite Animal: Dog
- Favorite Charity: ASPCA
- Custodian: Janet Smith
- Address: 123 Anywhere Ln.
  Smithtown, NY 11111
- By logging on, you have entered our daily, monthly, and annual raffle.

Daily Gift: CaptainBanker Stuffed Toy or 1 share of stock
Monthly Gift: 3-foot CaptainBanker Stuffed Toy or 25 shares of stock
Annual Gift: 5-foot CaptainBanker Stuffed Toy or 100 shares of stock A scholarship fund is being set up, a percentage of profits goes to the CaptainBanker Scholarship Fund "Every Child Should Be a Part of the American Dream...be the Capt

FIG. 8B

Bank Statement
(My Team)

- Teammates:

Jim Higgins  Ed Nolan  Nasrin Khazary
  Kathy McIntee  Arun Sengupta  Sarti Panza
  Joe Sisman  Franklin Taylor  Todd Watts
  Cameron Frank  Nathan Gadd  Lance Tovar Fundraiser
  - Bake Sale:     $200.45
  - Book Sale:     $520.20
  - Garden Sale:  $340.71
  - Raffle:           $600.00
  - Total:       $1,661.36

- Class gets best possible rate
- School automatically participates in Scholarship Fund
- NetZero, Free Internet Linkup, but we determine advertising
- Tie up with Camera Manufacturers for Free Digital Camera

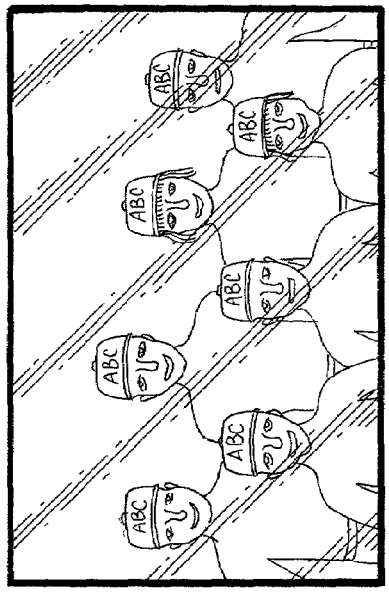

Coach: Carmine Serra
Team: Reds
Date: October 2000

FIG. 9

SYSTEM AND METHOD FOR PROVIDING FINANCIAL SERVICES TO CHILDREN AND TEENAGERS

BACKGROUND OF THE INVENTION

1. Field of the Invention

This invention generally relates to the field of electronic commerce, and in particular to a third generation business-to-business-to-consumer (B2B2C) content management and delivery infrastructure for the fragmented financial services industry.

More specifically, the system and method of the invention serve to create an interface between existing providers of financial services such as banking and brokerage services and children and teenagers (hereinafter referred to collectively as "children"). The interface includes a simple, "kid-friendly" bank statement that provides a fun and educational way of accessing the financial services while educating children and teenagers about money and personal finance, encouraging savings, and providing a convenient way of providing gifts of money or securities, and that may include additional educational features, or links to additional educational features, such as a dialog box through which answers to specific questions concerning finance or financial services may be obtained. The "kid-friendly interface" thus serves as an intermediary between one or more financial service providers and the child, or between the one or more financial services providers and an adult who wishes to make a gift to the child, and in addition may be adapted to serve as a portal through which the child may access a variety of child-related services and vendors, and through which vendors and service providers having products of interest to children may offer targeted information, educational, and promotional materials.

2. Description of Related Art

At present, youth accounts provided by financial services companies are aimed at adult use, i.e., they hold a child's money, but do not provide the child with the ability or incentive to access the account. This lack of financial knowledge on the part of young people and, perhaps more importantly, the incentive to learn more about finance and savings is a serious problem in the United States and other developed countries.

One of the most difficult concepts for a child to grasp is the concept that money is not an inexhaustible resource which magically appears in a parent's wallet or purse, or upon presentation of a credit or debit card, whenever a purchase needs to be made. In today's relatively affluent society, appreciation for the value of work and savings is diminishing, even while the concept of money becomes ever more abstract. The result is a generation less prepared than any previous generation to face the inevitable ups and downs of the economy, or to accumulate wealth in a way that benefits themselves and society as a whole.

Children who use computers to access the Internet and whose families make purchases on-line are even more likely to view money as intangible because of the manner in which such purchases are completed. Upon deciding to the purchase the product, the parent simply types in a number or, in some cases, simply indicates a desire to charge an account whose number has previously been stored, and a few days later the desired product appears at the child's doorstep. Even if the child understands that there is some relationship between the purchase and the fact that his or her parents leave for work in the morning, the child will seldom grasp the exact nature of the relationship.

While materials for teaching children about money and encouraging savings certainly exist, both on and off the Internet, for every call to financial responsibility, there are 10,000 calls to purchase a product or service. Finance, as an educational topic, cannot compete with the attractions of contemporary marketing. Currently available educational materials, such as the "Board Game For Teaching Fundamental Aspects Of Personal Finance, Investing And Accounting" described in U.S. Pat. No. 6,032,957, have a relatively limited appeal in comparison with the multimedia attractions of the various child-oriented ".com" websites. A website that educated children about personal finance and that could compete with other child-oriented websites would clearly be of benefit not only to children visiting the website, but also to society in general.

Of course it is marketing and not education that pays for the Internet, and few sophisticated websites, and in particular those including multimedia, can be maintained without marketing, which would seem to be contradictory in a website that sought to encourage savings. Nevertheless, any website that seeks to provide an educational service, including those that seek to teach fundamentals of finance, must at the same time find a way to attract revenue. To be successful, any website must in general offer benefits both to users of the site and to underwriters of the website, i.e., the website must educate in a way that attracts users to the site, and that in turn attracts those who wish to sell to those users. In the case of a website that seeks to educate children about personal finance by providing financial services to children, an additional source of revenue is essential since children are unlikely to have accounts as large as those owned by adults.

Systems and methods for providing financial services over the Internet are of course well-known. Numerous websites are set up to provide banking and/or brokerage services to adults, including one proposed site described in U.S. Pat. No. 5,953,710, which enables a parent to manage a custodial credit card account on behalf of a child. Among the activities that can be carried out on these sites are the viewing of account statements and the gathering of financial information, as well as purchases and sale of securities, transfers of funds between accounts, and payment of bills. However, none of websites are structured in such a way that would make them suitable for providing financial services to children in a commercially viable manner.

The task of attracting children to a website is especially difficult because of the great variation between what attracts children of different ages. A thirteen-year-old will not have the same interests as an eight-year-old or a four-year-old. Yet if a financial services website is to be successful, it must be able to hold the interest of all age groups, from the youngest to those ready to open accounts on adult financial services websites.

The lack of websites directed to providing financial services to children leaves an enormous gap between those who seek to market to children and those who wish to teach children about savings and earnings. Piggy banks, allowances, and passbook savings accounts which can hardly compete with the contrary message provided by most child-oriented ".com" sites. Lectures by parents and teachers are no substitute for hands-on experience, and yet because children cannot enter into legally binding contracts, and because the revenues generated by individual child accounts are likely to be small in comparison with the cost to an individual financial services provider of managing the site, there is currently little immediate incentive for financial services providers to provide a site which assists parents and others in teaching children about money and finance by enabling the child to actively participate in managing a real bank or brokerage account.

While it would be impractical for an individual financial services provider to set up a website directed towards children, it is just as impractical to set-up a new bank or brokerage for that purpose. As a result, any website that seeks to provide financial services to children would need to be able utilize existing financial services providers, and preferably multiple financial services providers, including banks, brokerage houses, mutual fund providers, and even insurance companies. Convenient and practical ways must be found not only to offer financial services to children in an attractive, educational, and commercially viable manner, but also to serve as an intermediary between child-customers and existing financial services providers such as banks and brokerage houses.

In summary, there is a need for an Internet-based system of encouraging savings and of teaching children about money and personal finance that can compete with other child-oriented Internet sites, and that can meet the following requirements:

(i) the system must offer an interface that provides information necessary to manage an account, and preferably information on personal finance and financial services in general, and yet that also incorporates the technological bells and whistles to compete with conventional non-financial service providers and encourage use of the system, (ii) the system must provide a revenue stream that is not dependent on the value of financial services provided, and (iii) the system must include the ability to interface not only with children but also with existing financial services providers.

The present invention is intended to meet these requirements by using a novel account statement that serves as an education tool, as a way of attracting users, as a medium through which marketers may promote products and services, and as an intermediary between the users and existing financial services providers.

SUMMARY OF THE INVENTION

It is accordingly a first objective of the invention to provide a system and method of offering financial services to children of all ages, in a way which encourages savings and educates children about money and finance.

It is a second objective of the invention to provide a system and method of offering financial services to children which integrates multimedia into the site in a way that does not interfere with basic account management functions.

It is a third objective of the invention to provide a system and method of offering financial services to children that provides multiple revenue sources apart from fees and commissions directly associated with the provision of financial services to a child, the additional revenue sources including fees associated with enabling gifts of financial instruments to be made by relatives and other interested parties, helping them invest in the child's future, revenue derived from the collection of data of interest to marketers and the inclusion of associated links to other child-oriented sites, and revenues derived from the offering of financial services not only to children, but also to organizations and clubs that might benefit from a simpler and more attractive interface to enable members to access basic account data.

It is a fourth objective of the invention to provide a system and method of offering financial services to children in a non-destructive manner, i.e., by supplementing the processes of existing financial services providers, rather than by-passing or competing with them in order, to enable use of the existing financial services infrastructure.

It is a fifth objective of the invention to provide a fun, creative, and educational way for relatives and other interested parties to participate in the education of the child and at the same time invest in the child's future.

It is a sixth objective of the invention to provide a financial portal adapted for use by children in order to provide easy access to electronic commerce sites of interest to children, and to provide a marketing tool for companies interested in targeting children.

It is a seventh objective of the invention to provide an account statement suitable for use by financial service providers that includes not only account information, but integrates multimedia audio and video files that provide background on specific items in the account statement as well as answers to questions on financial services and finance in general.

It is an eighth objective of the invention to provide a financial services account statement that includes links to non-financial information of interest to a child.

It is a ninth objective of the invention to provide a child-friendly financial services account statement that grows with a child, adapting as the interests and experience of the child change.

It is a tenth objective of the invention to provide a child-friendly financial services account statement that integrates information on a wide variety of different account types representing different financial products offered by different financial services providers, and that further provides links to additional information on personal finance and financial services in general.

It is an eleventh objective of the invention to provide a child-friendly financial services account statement that provides a convenient way for companies to offer promotional information to the child.

It is a twelfth objective of the invention to provide a financial services account statement that includes links to information of interest to members of a particular organization.

These and other objectives of the invention are achieved, in accordance with the principles of a preferred embodiment of the invention, by providing a system and method for providing financial services to children which, upon log-in by a child, a. retrieves information about the child from a personal information database, b. retrieves an age-appropriate integrated financial services account statement from an account statement database, the account statement including links to multimedia files stored in a company information database, c. retrieves current account status information from at least one financial services provider based on account information retrieved from the personal information database, d. inserts the retrieved personal information and current account status information into the integrated financial services account statement, e. displays the account statement as a web page or window in a web page, and f. upon selection of a link to one of the multimedia files stored in the company information database, retrieves the multimedia file and transmits it to the user for playback.

The age-appropriate integrated financial services account statement for use in connection with the system and method of the invention thus serves as an interface between financial service providers and children, and not only includes a listing of assets held in the name of the child, but also up-to-date personal information retrieved from the personal information database and links to multimedia files that contain information related to the assets listed in the statement as well as information concerning other companies and industries in which the child may have an interest. The personal information may include the child's birthday, favorite color, sport, character, animal, band, and charity, as well as a photograph of the customer.

The company information, which is associated with securities of the company, may be in the form of audio or video informational files, and may further include links to promotional materials such as coupons offered by the company. A direct communications link to the company allows the company to update multimedia and other files associated therewith in the company database. In addition, multimedia files related to other types of financial products listed in the account statement may be stored in the company database, including files related to countries associated with a particular mutual fund.

The personal information may be used, with appropriate privacy protections, as a source of marketing data which may be provided to selected companies interested in marketing to visitors to the site, and as a source of information on which to place targeted advertisements or hyperlinks related to the interests of particular users of the site, thereby providing a revenue stream apart from the provision of financial services. The technology by which personal information collected at a site may be converted into targeting advertisements or promotions in order to develop a revenue stream based on referrals, an example of which is described in U.S. Pat. No. 6,029,141, is well-known and forms no part of the invention apart from its incorporation in a system and method of providing financial services to children.

It will of course be appreciated by those skilled in the art that the age-appropriate integrated financial services account statement is not intended to be the sole vehicle by which accounts are managed. Instead, from the standpoint of account management, the statement is intended to provide an incentive to active participation by the child in management of the account. By utilizing existing financial services providers, legal issues with respect to contracting by minors are avoided since set-up and ultimate responsibility for an account would still need to be established by contract between the individual financial services provider and an adult, according to well-established procedures. The account statement is designed not so much to enable a child to independently manage an account, but rather provides an invaluable tool to assist the adult in teaching the child about money and finance, with the willing and active participation of the child, and to the benefit not only of the child and responsible adult, but also of financial service providers in building brand loyalty and creating future customers, and to society in general.

Of course, benefits to society in general cannot alone support a business, and thus the potential revenues that can be obtained from the site must be considered. Because it is not permissible for non-financial services providers to derive revenue from transaction fees for the financial service providers, alternative revenue sources are necessary. One revenue source would of course be fees charged for advertising or listing on the site, while another would be revenue resulting from the collection of marketing data, as discussed above. In addition, a significant revenue stream may be provided by including in the system and method of the invention a gift-giving and/or gift registry service.

According to the gift-giving or gift registry service aspect of the invention, a visitor to the site may log-in either as a child/account holder or as a gift giver. Upon sign-in as a gift giver, the system and method of this embodiment:

a. queries the giver as to the identity of the child, b. displays a financial product selection pages, upon selection and purchase of a product by the gift giver, c. contacts the appropriate financial services provider, and d. updates the child's account, and provides a gift card to the recipient of the gift.

Advantageously, the gift card may include not only information on the gift, but also links to the above-mentioned company database. It may be displayed upon sign-in by the child, or preferably by electronic mail to the child's home electronic mail address, with an invitation to visit the financial services site of the invention for further details.

The display presented to a potential gift giver may further be arranged to include only financial products selected from a gift registry stored in a gift registry database and associated with the name of the child, and/or may be further arranged to solicit information that can be used to provide reminders of gift giving occasions to the gift giver, or to otherwise solicit information from the gift giver concerning the child or giver for use consistent with any privacy guidelines or statutory limitations on use or collection of information about a child.

The integrated financial services statement of the preferred embodiment of the invention is not limited to use in connection with a system and method of providing financial services to a child, as the term child is used herein to include teenagers and possibly young adults as well as children, but also to the provision of financial services to associations, clubs, teams, and other organizations, and in particular to the provision of a statement containing public information which can be accessed by members of the organization as well as by potential members, and which provides information on the organization retrieved from a database of organization information in addition to the above-mentioned multimedia files associated with specific companies or financial products.

In addition to providing information on specific companies or organizations through the interactive financial services statement, the system and method of the invention preferably also has the capability of providing information on personal finance and financial services in general, for example by including a dialog box or window through which the user may submit specific queries concerning financial topics. Answers may be provided in real time, or via electronic mail.

Finally, the website constructed for the purpose of implementing the system and method of the invention may further include access to child-friendly versions of instant messenger and personal electronic mail services, access to additional education materials, games, or contests concerning money, personal finance, or other topics, access to products related to tangentially related to financial services such as insurance, hyperlinks to other child friendly sites, and even storage of favorite websites of the child, effectively transforming the site into a portal or start page to which the child will turn whenever access to the Internet is desired.

BRIEF DESCRIPTION OF THE DRAWINGS

FIGS. 4A–4C are screen displays of a portfolio summary statement and detailed asset statements that may be used in place of the integrated statement of FIG. 1.

FIG. 8A is a screen display of a modification of the preferred age-appropriate integrated account statement for use by older children, including teenagers.

FIG. 8B is an information page for use in connection with the preferred age-appropriate integrated account statement, for permitting a child to review and access stored personal information.

FIG. 9 is a screen display of a modification of the preferred age-appropriate integrated account statement for use by organizations or clubs.

DETAILED DESCRIPTION OF THE PREFERRED EMBODIMENTS

Figure 1:
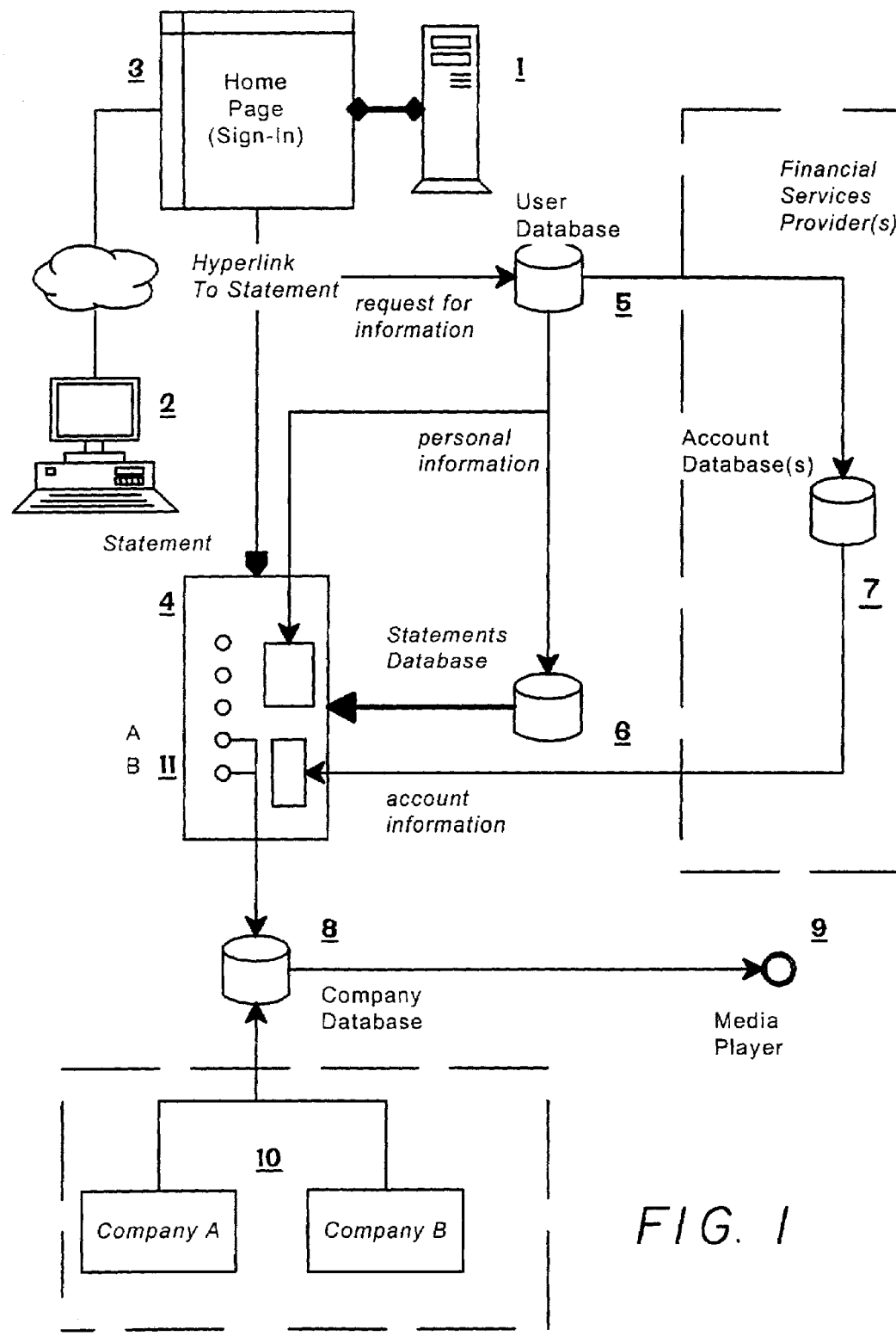
FIG. 1 is an illustration of a system for providing financial services to a child according to a preferred embodiment of the invention.

As illustrated in FIG. 1, the system of the invention includes a server 1 arranged to generate documents using hypertext markup language or a similar language that integrates text, graphics, and links to other documents, commonly referred to as web pages, and to transmit them over the Internet to a user 2 in response to requests transmitted by the user. The initial document transmitted to the user upon addressing the server is a home page 3 arranged to provide sign-in options requesting that the user identify himself or herself and, in the case of an existing account holder, supply a password or other identity verification data. The physical construction of the server and the manner by which it generates web pages and transmits them to users, as well as the sign-in procedures that may be used in connection with home page are well-known and form no part of the present invention.

Figure 2:
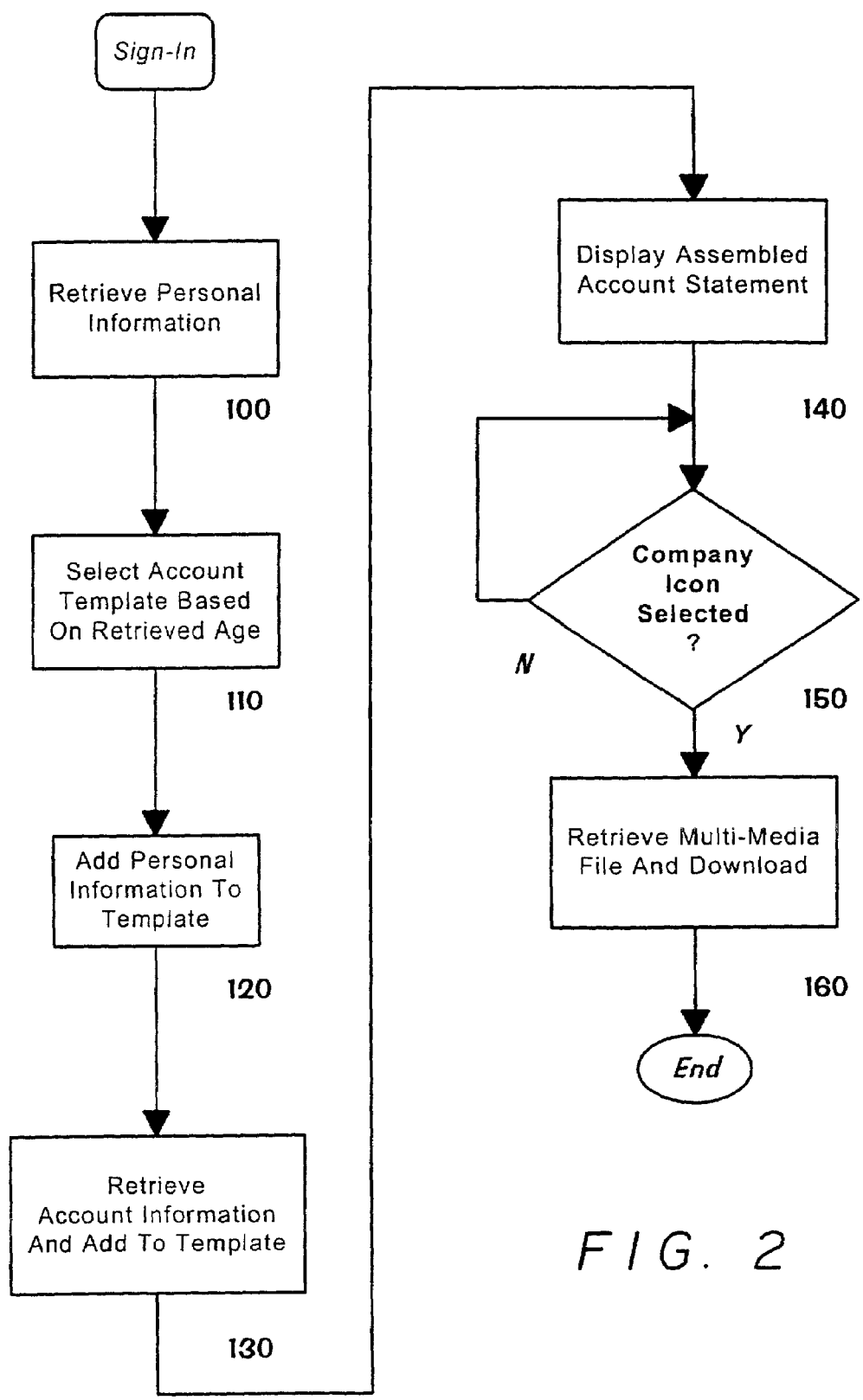
FIG. 2 is a flowchart of a method for implementing the system of FIG. 1.

One of the options presented by the home page 3 is the option of accessing account information. Selection of an icon or hyperlink representing this option causes an age-appropriate integrated financial services account statement 4 to be assembled and displayed, according to the method illustrated in FIG. 2.

First, upon log-in by a child or on behalf of the child, the system illustrated in FIG. 1 retrieves user information associated with the identification data entered upon sign-in from a personal information database 5 (step 100). The system uses the retrieved user information, which includes at least the age of the user, to select an age appropriate account statement template from a database 6 (step 110). Additional personal information retrieved from the database 5 is then added to the account statement template retrieved from database 6 (step 120). The identity of the user and any necessary passwords or other information collected during sign-in or retrieved from the personal information database 5 is then sent to all providers of items to be included in the statement. If there is more than one financial service provider, the identity of the user is compared to information in database 5 which associates the user with one or more financial service providers and the identity of the user is sent to the appropriate providers. The account information is retrieved from an appropriate database, returned by the financial service provider(s), and inserted into the account template (step 130) in order to form a statement page or window corresponding to the one illustrated in FIG. 3 for display by transmission by server 1 to user 2 (step 140).

Upon selection of a link to one of the multimedia files stored in a company information database 8 described in more detail below (step 150), the system retrieves the appropriate multimedia file from the database 8 and server 1 transmits or downloads the retrieved multimedia file to the user for playback over a compatible media player 9 (step 160). The multimedia files in the company device may have been provided directly by one or more companies 10 and/or produced by the operator of server 1.

It will of course be appreciated by those skilled in the art that the various "databases" illustrated in FIG. 1 need not be separate databases but rather may be included in one or more than one physical data storage devices, and further that information in the various databases need not be stored separately as discrete entities but rather may be combined in any convenient manner, and that the databases may be in the forms of lists, registries, or any other data storage format.

In addition, it will be understood by those skilled in the art that the database of account information may be maintained at the site of the financial services provider or locally, or that certain account information may be stored locally and other information stored in a database maintained at the site of the financial services provider. In either case, the manner in which the financial services information is stored and protected may be entirely conventional and correspond to that used by current on-line banks or brokerages. Also, the manner in which the account information is included in the age-appropriate account statement for display may be conventional.

Unlike the convention brokerage or online banking systems, however, statement serves as an educational/marketing tool for individual companies. To accomplish this, a database of promotional files is preferably maintained, the database being updated by the companies through communications links to the company. Although local storage of multimedia files is preferred, it is possible to have a company supply files directly over the communications link, and to maintain its own database of files accessed through the communications link upon selection of the appropriate image.

Figure 3:
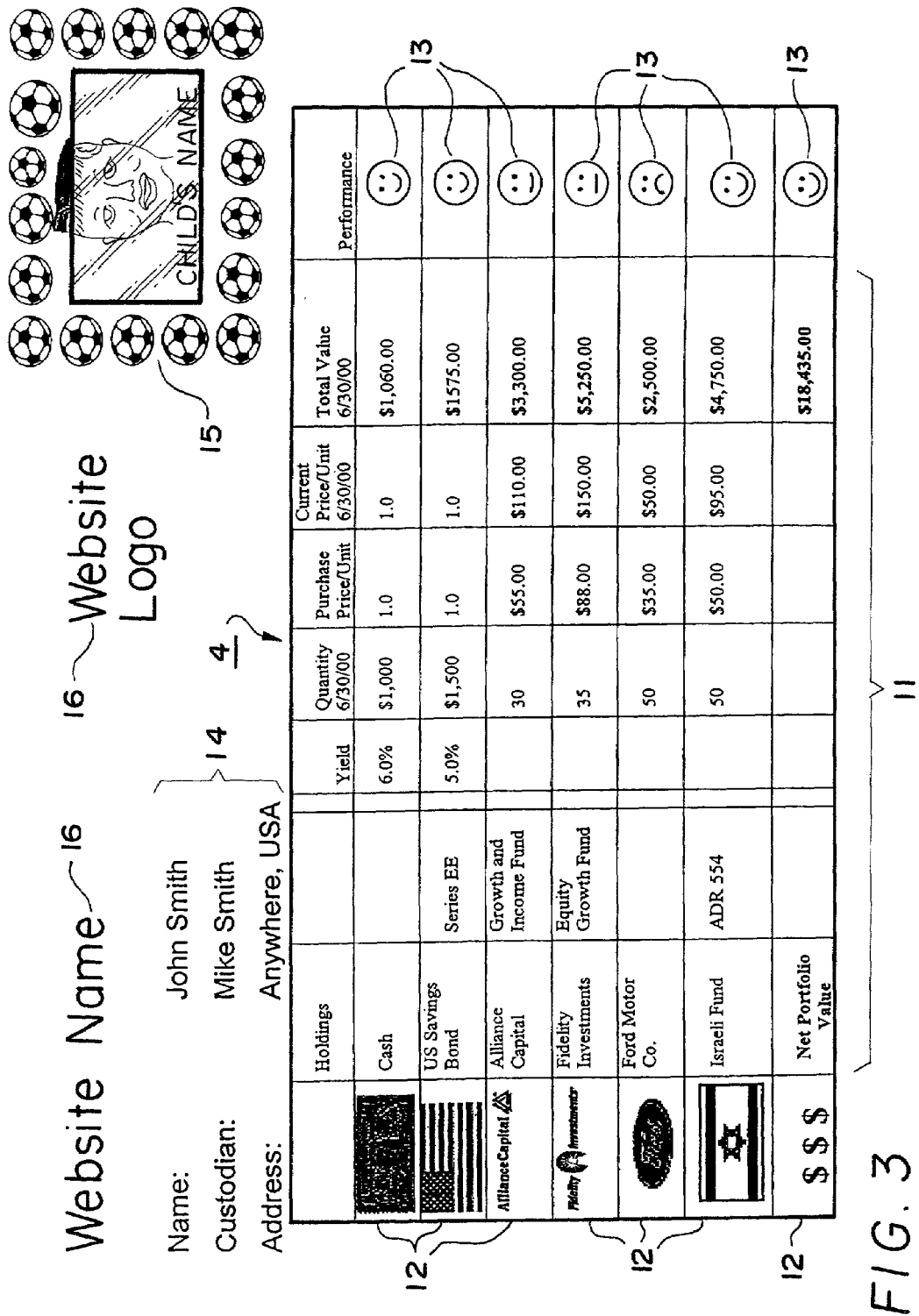
FIG. 3 illustrates an age-appropriate integrated financial services account statement according to the principles of the preferred embodiment of the invention.

As illustrated in FIGS. 1 and 3, the age-appropriate account statement 4 combines an integrated asset statement with a series of images or icons 12 representing logos associated with a particular holding. In the case of stocks, the icons 12 may represent companies, while in the case of mutual funds, the icons may represent countries, mutual fund companies, or other images associated with the fund. The account information may include not only information on securities and mutual funds, but also information on cash in a savings account or that has been invested in certificates of deposit, governmental and privately issued bonds, and gifts, with corresponding icons.

When an icon is selected, a multimedia file is retrieved from database 8, downloaded to the user 2, and an appropriate viewer or media player 9 is selected to display the multimedia file, which contains information on the company, country, mutual fund, or other icon sponsor. The multimedia file may be in the form of a video or audio file, and/or a display of images and text. By way of example, selection of a company logo may cause a theme song from an advertising campaign to be played, while selection of a country logo representing a mutual fund may cause a national anthem to be played. Companies may provide changing multimedia files to ensure continued interest. Included in the integrated asset statement 11 are lists of holdings, and financial information such as statements of yield, quantities, purchase and current price, total value, and so forth.

In addition to the multimedia icons 12 and integrated asset statement 11, the invention provides for the addition to the integrated age-appropriate account statement of a graphical summary of asset performance, illustrated as a face 13 indicating three different moods reflective of fund performance, as well as user-identification information 14, a photograph 15 of the child in whose name the assets are held, and a website name and logo 16. It will be appreciated that other text and graphics, such as a display of such personal information as the child's favorite color, sport, character, animal, and so forth, may also be added to the statement, including animation, in order to add interest to the page on which the statement is presented.

Figure 4A:
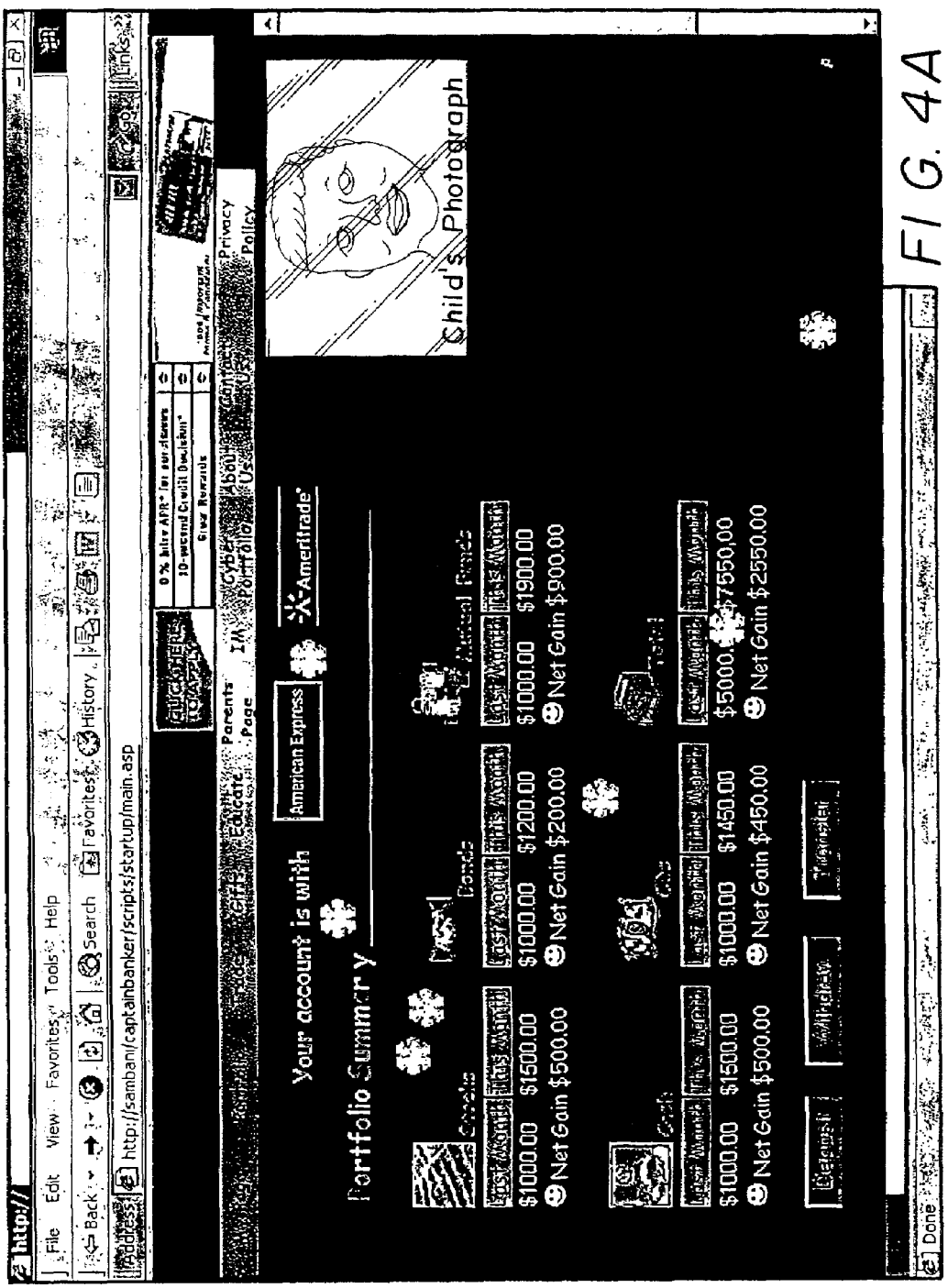

According to a variation of the preferred embodiment illustrated in FIG. 3, the age-appropriate integrated account statement may be broken down into multiple pages accessible from a summary page illustrated in FIG. 4A. For example, the individual age-appropriate account statement pages may include a stock statement page illustrated in FIG. 4B and a mutual fund statement page illustrated in FIG. 4C.

The summary page illustrated in FIG. 4A may, by way of example but not limitation, include current and previous month balances for each type of asset held, a symbolic representation of performance in the form of the above-mentioned faces, and icons which provide links to individual statement pages. In addition, the summary page illustrated in FIG. 4A may include a photograph of the child, banner advertisements, and links common to multiple pages on the site which permit access to the summary page (the "portfolios" link), as well as to other pages such as a link entitled "my page" which retrieves a page that permits the child to enter view and enter personal information, as described below, links to a page that permits trading of securities and other assets, a page that permits purchase of gifts according to the method described below, and links to further education materials, and links to other pages on the website such as an "about" page or pages containing legal disclosures, terms and conditions, contact information, and a privacy policy.

The stock statement page illustrated in FIG. 4B is specifically directed to stock investments. In this statement, two images are provided for each company or fund listing. The first image recalls a file containing information about or related to the company, such as the above-mentioned company song. In this statement, a separate icon is included for display of a more educational or informative video concerning the company. For example, the video may be a video in which a company representative explains what the company does, manufactures, or provides, and explains the industry, or a video may be provided which gives information concerning financial information, market position, and competition. Of course, separate icons may be provided for the two types of videos, and for any other categories of multimedia files that may be associated with a particular company, so that the child or parent can choose the type of information to be viewed. The second icon is of a product offered by the company. Selection of the second image causes the system and method of the invention to select an alternative multimedia file concerning the product, download a graphical image of coupon or other promotion or contest, that can be printed by the user, or provide a hyperlink to a promotional website.

An advantageous feature of the statement illustrated in FIG. 4B, in addition to the dual company/product multimedia icon arrangement, is its organization into categories that can be understood by young children, including for example, automobile manufacturers, toy manufacturers, country funds, and so forth. Other features of the stock statement page may include a graphical, easily understood representation of stock or fund performance, in the form of the above-described faces, and listings of, for example, the current price and basis or purchase price for individual stocks and funds.

Figure 5:
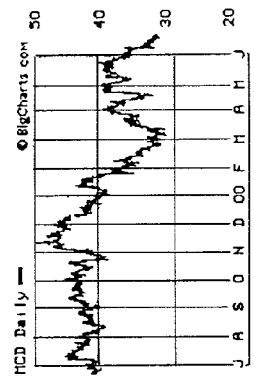
FIG. 5 is a screen display of a more detailed account statement for use by parents of the child.

FIG. 5 presents yet another statement page, listing mutual funds and including only a single icon for retrieving multimedia files appropriate to the fund, but otherwise identical to the stock statement page. Advantageously, the mutual funds may be conventional mutual funds whose names are changed for presentation to the child, or the mutual funds may be designed specifically for presentation on the website, or even to individual children, depending on information collected concerning the child.

The statements illustrated in FIGS. 1, 4, and 5 are designed for younger children, aged 12 and below. Statements having a more conventional appearance may of course be provided for older children, teenagers, and/or their parents, also either as templates retrieved from database 6 and assembled according to the method illustrated in FIG. 1, as well as links to conventional statements provided by the financial services provider for the corresponding asset.

According to another aspect of the invention, the system and method of the invention enables stocks or shares of mutual funds to be purchased in the child's name, and the child presented with a certificate or gift card having embedded therein a company or fund icon or image similar to the company or fund images that appear on the account statements or statement pages described above.

Figure 6:
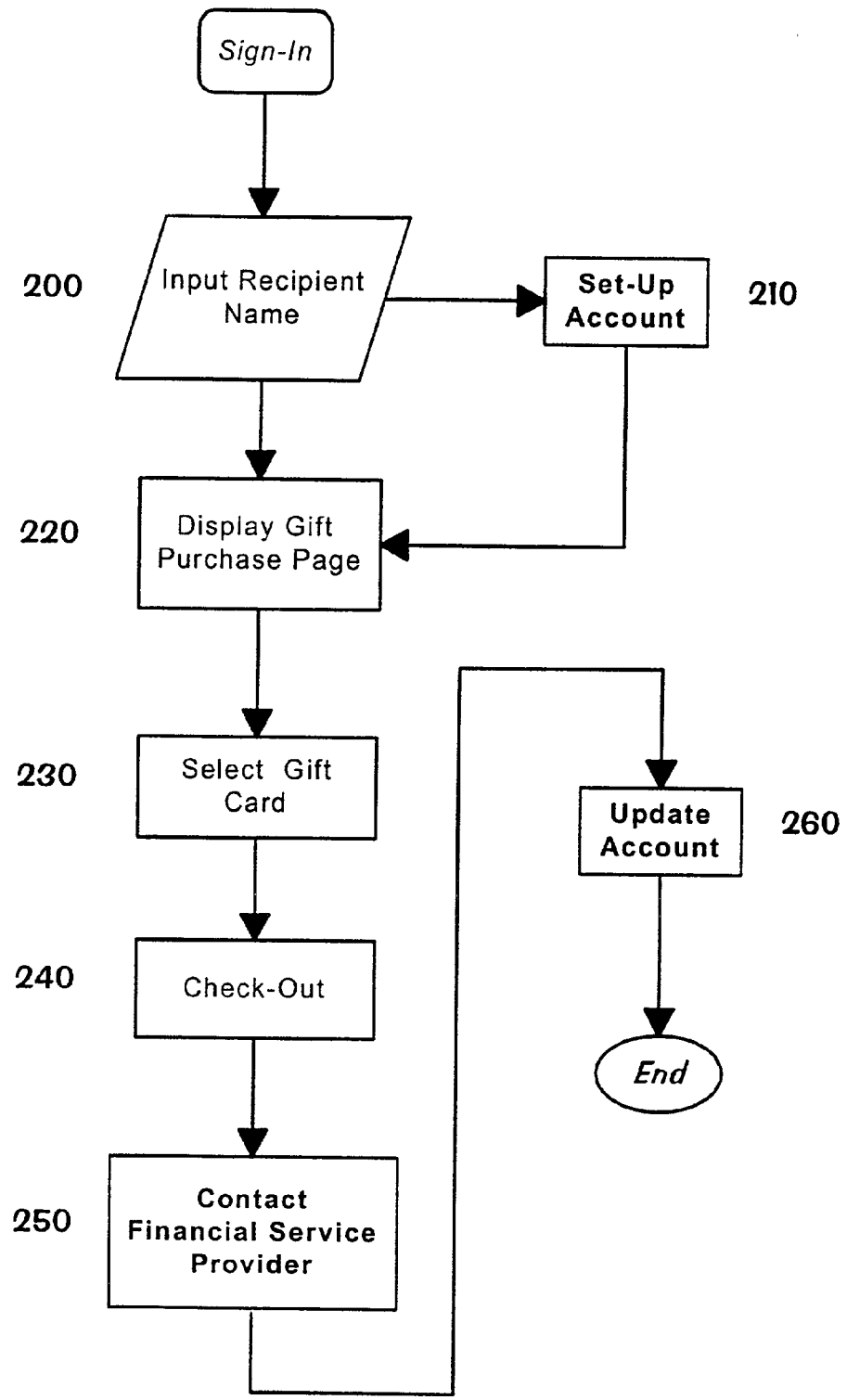
FIG. 6 is a flowchart of a gift giving method according to the principles of the preferred embodiment.

As illustrated in FIG. 6, upon logging-in as a gift giver, the gift-giver is prompted to input the name of the recipient if an account has already been established (step 200), and to set-up an account for the recipient if an account has not already been established (step 210). The system and method then displays a displays a purchase selection page (step 220). The purchase selection page may be in the form of a simplified page similar to the stock statement described above, or it may be in the form of a conventional stock purchase page of the type used for conventional brokerage accounts. If in the form of a simplified page, hyperlinks may be provided to enable the purchaser to request additional information.

According to an especially advantageous embodiment of the invention, the selection page displayed for the gift giver may be arranged to display selections retrieved from a gift registry maintained in the child's name, facilitating the purchase of relative small amounts of stock which can be added to the child's asset portfolio. This allows the gift-giver to purchase small amounts of stock, for example, just two shares of McDonalds™ stock, which can be added to the child's existing holdings without having to set-up of a separate record to account for the two shares. This also permits the gift-giver to rely on the parent's or child's research or desires concerning the types of companies or funds in which stock is to be owned.

Once the stock is selected, the user may optionally be prompted for selection of a gift card and/or input of a message to be added to the gift card (step 230). The program then proceeds to check-out (step 240), using a conventional electronic commerce sub-routine to obtain payment information, such as the gift giver's credit card number if credit card purchases are permitted, or to inform the giver as to payment options.

Following selection of a financial product to be purchased, the system of the preferred embodiment contacts the appropriate financial services provider (step 250), and updates the child's account by, for example, updating databases 5 and 7 (step 260). If payment is by credit card, a gift card is immediately associated with the recipient's identifier and the recipient is given the option of viewing the card upon log-in, or notified of the gift by electronic mail with a link to the website. If payment is not made by credit card, payment must be made directly to the financial services provider, which then sends a confirmation to the system of the preferred embodiment, at which time the gift card may be sent or displayed.

Figure 7:
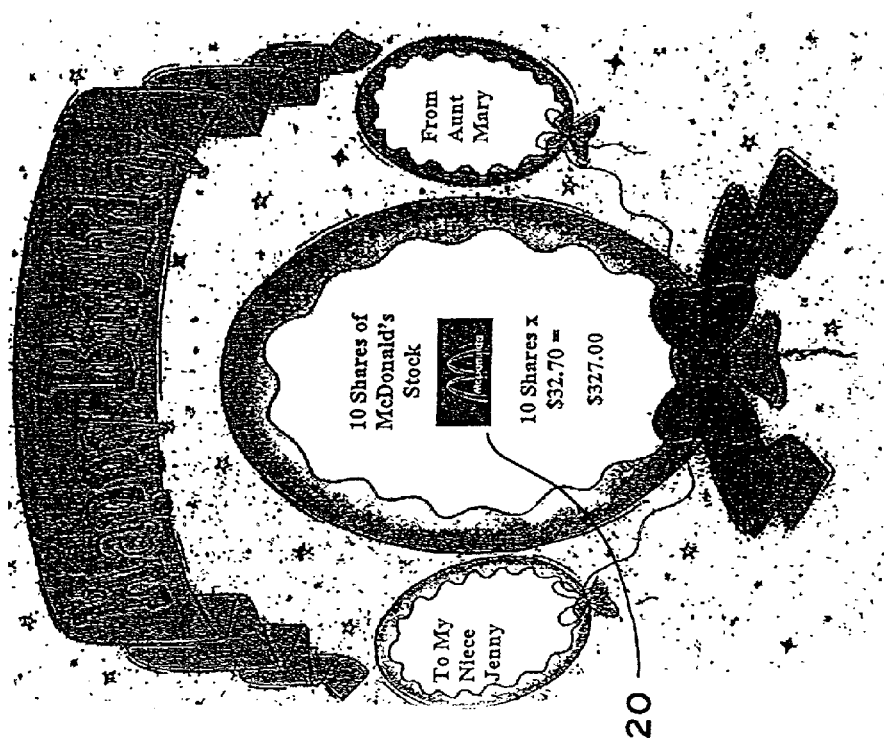
FIG. 7 is a screen display of an integrated gift card for use in the preferred method.

An example of a gift card is illustrated in FIG. 7. The gift card is in the form of a web page or window having a design related to the occasion of giving as input by the donor, an indication of the type of stock purchased and the quantity, as well as the price of the stock, which may be a current price or the purchase price of the stock. In addition, a personal message from the donor may be included, and/or a message generated based on the recipient and donor information and the type of card selected.

Uniquely, the gift card includes an image or icon corresponding to the corporate icons of the stock statement, which when pressed summons a multimedia file or links to a separate page retrieved from a local database or a database maintained by the company in question, and which can include promotional messages, coupons, or the like in a manner similar to the icons included in the integrated account statement of FIG. 3 or the respective stock and fund statements of FIGS. 4B and 4C.

Rather than listing the cash account on a summary statement, it is of course within the scope of the invention to provide a more detailed bank statement, which can also be integrated with a child's profile. FIG. 8A shows a statement designed for an older child in which personal data entered by the child is displayed together with various information related to the child's account, as well as educational displays concerning the benefits of saving, and charts concerning such items as spending by the child, and so forth. If such a statement is provided for a younger child, it may have a simpler, more graphic intensive format, such as a display of a singing purple dinosaur or other trend item for a child one to five years of age, a child-like aardvark for a child five to eight years of age, a portable monster for a child nine to twelve, and so forth.

According to another aspect of the invention, the integrated profile/bank statement may be set up for a group, such as a club or team, account. The integrated statement is intended to be viewable by any member of the group, and may include a group photograph, information on the group such as a membership roster, and a statement of current balances by, for example, source. The account may be set up to accept deposits from scholarship programs, or charitable contribution programs such as those sponsored by supermarkets or manufacturers which give a percentage of sales to the group. The groups may be school groups, sport teams, scout troops, investment clubs, or even adult associations such as fraternities, parent-teacher associations, and other organizations that wish to provide for inspection of organizational finances in a simple and intuitive fashion.

Figure 10:
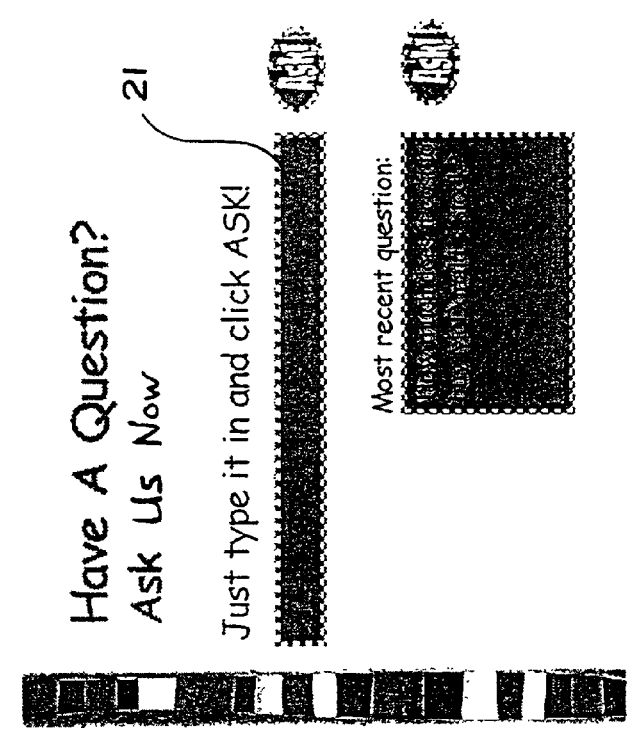
FIG. 10 is a screen display of a dialog box or window through which a user may submit specific queries concerning financial topics.

In accordance with a further aspect of the present invention, in addition to providing information on specific companies or organizations through the interactive financial services statement, the system and method of the invention preferably also has the capability of providing information on personal finance and financial services in general, for example by including a dialog box or window of the type illustrated in FIG. 10 through which the user may submit specific queries concerning financial topics. The simplest queries, such as the price of a stock, could be answered automatically by appropriate software, while more complex answers may be provided in real time by human service personnel, and very complex questions or those requiring lengthy answers may be answered via electronic mail.

Finally, in addition to serving as child-oriented interface to permit viewing of accounts, to encourage savings and educate children concerning finances, and to provide a vehicle for gift giving, the system and method of the invention may be used to provide a portal for through which the child may access a wide variety of child-related services and products.

For example, the home page of the site may include links to an address book listing the names of classmates, and other information updatable with information received during use of the site so that a user may keep track of the classmates after graduation from the class, with the possibility of download to a personal information manager program or personal digital assistant. Other links may include links to a photo album, page on which homework may be posted, class chat rooms, special offers for members of the class, local banner advertising, schedules and information on local organizations, a personal scheduler, customized stationary, birthday invitations, a page for tracking current status of a library card, and a calendar with school activities and links to a school menu.

As a portal, the system and method of the invention might also offer such services as the maintenance of personal electronic mail or instant messenger accounts, website hosting, a search engine, or any other services that might be of benefit to users of the site. In addition, photographs of missing children may be included on the site with links to appropriate authorities.

Having thus described preferred embodiments of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

I claim:

1. A system for providing financial services to children, comprising a server, a computing device arranged to generate documents for display over an open network, communications links to financial service providers, and a data storage arrangement, the data storage arrangement including storage areas in which are stored personal information including an age of an account holder, account information, and information of interest to the account holder but irrelevant to said financial services, said information selected from the group consisting of the a picture of the account holder and at least one of the account holder's favorite color, sport, character, band, charity, hobby, pastime, and animal, a plurality of integrated financial services account statement templates, and multimedia files, the server being arranged such that, upon log-in by a user, the computing device:
   a. retrieves said personal information from said data storage arrangement,
   b. based on said age of the account holder, selects one of said integrated financial services account statement templates from said data storage arrangement,
   c. retrieves current account information from at least one of said financial service providers based on said stored account information,
   d. assembles an integrated financial services account statement by inserting at least some of said personal information and said current account status information into said said one of said account statement templates retrieved from said data storage arrangement, wherein said account statement displays said retrieved information selected from the group consisting of a picture of the account holder and at least one of the account holder's favorite color, sport, character, band, charity, hobby, pastime, and animal,
   wherein said integrated financial services account statement includes images which, when selected by the user, causes one of said multimedia files to be retrieved from said data storage arrangement, and
   wherein when the user selects one of said images, said one of said multimedia files is retrieved and downloaded to the user over said open network by said server.

2. A system as claimed in claim 1, wherein said multimedia files include promotional information supplied by a company listed on the integrated financial services account statement.

3. A system as claimed in claim 2, wherein said integrated financial services account statement further includes images associated with a product offered by the company, and wherein user selection of one of said images associated with the product causes a multimedia file including information on said product to be downloaded to the user.

4. A system as claimed in claim 1, wherein the computing device is further arranged, upon sign-in by the user as a gift giver, to query the giver as to the identity of a child recipient, display a financial product selection page, contact a financial services provider upon selection and purchase of a product by the gift giver, and payment by the gift giver using any of a variety of payment options, update the child's account, and provide a gift card to the recipient of the gift.

5. A system as claimed in claim 4, wherein the gift card includes information on the gift, and a link to one of said multimedia files.

6. A system as claimed in claim 4, further comprising a gift registry database, wherein said financial product selection page lists items retrieved from said gift registry database.

7. A system as claimed in claim 1, wherein said personal information further includes information on an organization, and wherein said account information concerns an account held by said organization.

8. A method for providing financial services to children, comprising the steps of, following log-in by a user seeking information on assets held by a child or to give a gift to the child:
   a. retrieving information about the child from a personal information data storage area, said information including an age of the child and information of interest to the child but irrelevant to said financial services, said information selected from the group consisting of the a picture of the child and at least one of the child's favorite color, sport, character, band, charity, hobby pastime, and animal,
   b. based on the retrieved age of the child, retrieving an integrated financial services account statement template from an account statement template data storage area, the account statement including links to multimedia files stored in a company information database,
   c. retrieving current account status information from at least one financial services provider based on account information retrieved from the data storage area,
   d. inserting the retrieved personal information and current account status information into the account statement template to form an integrated financial services account statement, wherein said account statement displays said information selected from the group consisting of the a picture of the child and at least one of the child's favorite color, sport, character, band, charity, hobby, pastime, and animal,
   e. transmitting the integrated financial services account statement for viewing by the user, and
   f. upon selection of a link to one of the multimedia files stored in the company information database, retrieving the multimedia file and transmitting it to the user for playback.

9. A method as claimed in claim 8, wherein said multimedia files include promotional information supplied by a company associated with an asset listed on the integrated financial services account statement.

10. A method as claimed in claim 9, wherein said integrated financial services account statement further includes images associated with a product offered by the company, and wherein user selection of one of said images associated with the product causes a multimedia file including information on said product to be downloaded to the user.

11. A method as claimed in claim 8, further comprising the steps of, upon sign-in of the user as a gift giver:
   a. querying the giver as to the identity of the child,
   b. displaying a financial product selection page,
   c. upon selection and purchase of a product by the gift giver, and payment by the gift giver using any of a variety of payment options, contacting the appropriate financial services provider, and
   d. updating the child's account.

12. A method as claimed in claim 11, further comprising the step of providing a gift card to the child, said gift card including information concerning the gift and a link to one of said multimedia files.

13. A method as claimed in claim 11, wherein said financial product selection page lists items retrieved from said gift registry database.

14. A method as claimed in claim 8, further comprising the step of providing a personal information page to which said user may add personal information.

15. A method as claimed in claim 14, further comprising the step of collecting said personal information and providing data derived from said personal information to companies interested in said data.

16. A method as claimed in claim 8, wherein said personal information further includes information on an organization, and wherein said account information concerns an account held by said organization.

17. An electronic integrated financial services account statement assembled by the steps of retrieving information concerning an age of a child and information of interest to the child but irrelevant to said financial services, said information selected from the group consisting of the a picture of the child and at least one of the child's favorite color, sport, character, band, charity, hobby, pastime, and animal, upon sign-in by the user at a website, selecting an statement template based on the age of the child, adding account information to the template, and displaying the template on a webpage, wherein the template includes a plurality of images displayed on the at least one page, said images linking said page to multimedia files concerning said asset, and wherein said account statement displays said information selected from the group consisting of the a picture of the child and at least one of the child's favorite color, sport, character, band, charity, hobby, pastime, and animal.

18. An integrated financial services account statement as claimed in claim 17, wherein said images include representations of company logos and representations of company products, wherein when a user selects one of said company logo representations, a multimedia file providing information about the company is opened, and wherein when a user selects one of said product representations, a promotion for the product is displayed.

19. An integrated financial services account statement as claimed in claim 17, wherein items on said statement are listed by industry sector.

* * * * *